United States Patent
Flanigen et al.

[11] 3,867,305
[45] Feb. 18, 1975

[54] AMORPHOUS HYDROCARBON CONVERSION CATALYSTS AND PROCESS FOR PREPARING SAME

[75] Inventors: Edith Marie Flanigen, White Plains; Robert William Grose, Mahopac, both of N.Y.

[73] Assignee: Union Carbide Corporation, New York, N.Y.

[22] Filed: July 24, 1973

[21] Appl. No.: 382,151

Related U.S. Application Data

[63] Continuation-in-part of Ser. No. 192,344, Oct. 26, 1971, abandoned, which is a continuation of Ser. No. 775,189, Nov. 12, 1968, abandoned.

[52] U.S. Cl.............. 252/437, 252/438, 252/440, 260/669 R, 260/683.3
[51] Int. Cl................................. B01j 11/82
[58] Field of Search.............. 252/437, 438, 440

[56] References Cited
UNITED STATES PATENTS

| | | | |
|---|---|---|---|
| 2,380,617 | 7/1945 | Stewart et al. | 252/440 X |
| 2,786,758 | 3/1957 | Taylor | 252/440 X |
| 3,156,657 | 11/1964 | Pinder et al. | 252/440 |
| 3,219,590 | 11/1965 | Ribaud | 252/446 |
| 3,236,762 | 2/1966 | Rabo et al. | 252/455 Z X |
| 3,260,680 | 7/1966 | Sanford et al. | 252/440 X |
| 3,436,176 | 4/1969 | Spedden et al. | 423/120 |

*Primary Examiner*—Patrick P. Garvin
*Attorney, Agent, or Firm*—Richard G. Miller

[57] ABSTRACT

Novel amorphous compositions possessing catalytic properties may be prepared by controlled calcination of synthetic crystalline precursor material structurally related to the mineral jarosite, said precursor material being prepared and crystallized from an aqueous reaction mixture having a composition expressed in terms of mole ratios of oxides as $$q\, G_2O \cdot f\, Fe_2O_3 \cdot g\, L_2O_3 \cdot i\, XO_4 \cdot j\, H_2O$$

wherein G represents $NH_4^+$, $H^+$, $Ag^+$ or alkali metal ions or any mixture thereof, wherein $L_2O_3$ represents at least one oxide selected from the group consisting of $Al_2O_3$, $Cr_2O_3$, $V_2O_3$, $La_2O_3$, and $Ce_2O_3$; $XO_4$ represents at least one oxide selected from the group consisting of $PO_4$, $MoO_4$, $VO_4$, $SiO_4$ and $TiO_4$; $q$ has a value of from 0.5 to 6.0: $f$ has a value of from 1.5 to 4.0; $g$ has a value of from 0 to 1.0; $h$ has a value of from 8.0 to 10.0; $i$ has a value of from zero to 2.0: $j$ has a value of from 100 to 1,000: the sum of $f + g$ has a value not exceeding 4.0.

2 Claims, No Drawings

AMORPHOUS HYDROCARBON CONVERSION CATALYSTS AND PROCESS FOR PREPARING SAME

RELATED APPLICATIONS

This application is a continuation-in-part of pending application Ser. No. 192,344 filed Oct. 26, 1971 which is in turn a continuation of application Ser. No. 775,189, filed Nov. 12, 1968, both now abandoned.

This invention relates to novel amorphous heterogeneous catalysts which are especially useful in hydrocarbon conversion reactions and which are derived from synthetic crystalline material structurally related to the mineral jarosite.

Some of these new catalytic compositions are substantially devoid of sulfate and are essentially composed of oxide compositions derived from precursors structurally related to jarosite. The jarosite-related compositions have iron oxide as their primary oxide. Certain others of the catalyst compositions derived from the jarosite compositions can also contain sulfate.

It is the general object of this invention to provide novel amorphous compositions, including oxide and multi-component oxide compositions and ferrosulfate compositions, useful as catalysts, particularly in hydrocarbon conversion processes.

Another object is to provide a method for preparing the novel materials of this invention.

The synthetic crystalline materials or jarosite-type precursors, designated for convenience JTP, from which the novel catalyst materials of this invention are obtained by calcination, can be prepared by providing an aqueous reaction mixture having a composition expressed in terms of mole ratios of oxides as $$qG_2O \cdot fFe_2O_3 \cdot gL_2O_3 \cdot hSO_4 \cdot iXO_4 \cdot jH_2O$$

wherein G represents $NH_4^+$, $H_3)^+$, $Ag^+$, or alkali metal ions or any mixture thereof, wherein $L_2O_3$ represents at least one oxide selected from the group consisting of $Al_2O_3$, $Cr_2O_3$, $V_2O_3$, $La_2O_3$, and $Ce_2O_3$; $XO_4$ represents at least one oxide selected from the group consisting of $PO_4$, $MoO_4$, $VO_4$, $SiO_4$ and $TlO_4$; $q$ has a value of from 0.5 to 6.0; $f$ has a value of from 1.5 to 4.0; $g$ has a value of from zero to 2.0; $h$ has a value of from 8.0 to 10.0; $i$ has a value of from 0 to 2.0; $j$ has a value of from 100 to 1,000; the sum of $f + g$ has a value not exceeding 4.0; establishing the pH of said reaction mixture in the range of 1.5 to 4.5, digesting said aqueous reaction mixture within a temperature range of from about 80° to about 200°C. for a period of from at least 4 hours to a period sufficient to complete crystallization, and recovering the crystalline reaction product. Such reaction products are crystalline phases structurally related to jarosite.

In forming the aforesaid reaction mixture, ammonium hydroxide and the water soluble salts of aluminum, iron, chromium, vanadium, lanthanum and thallium such as their respective chlorides, sulfates, nitrates, acetates and the like are preferred. In those cases where the reagents do not impart the necessary amount of sulfate to the reaction mixture, sulfuric acid can be added in appropriate amount. The water soluble compounds of $PO_4$, $MoO_4$, $VO_4$ and $SiO_4$ are also preferred such as the acids which contain these moieties, for example $H_3PO_4$. The necessary pH of the reaction mixture of from 1.5 to 4.5 can result from the particular combination of reagents chosen, or if too high the pH can be lowered by the addition of simple inorganic acids such as hydrochloric, nitric or acetic acid.

Preferred means for preparing the synthetic crystalline precursors structurally related to jarosite comprise preparing reaction compositions of the foregoing formula type wherein G is $NH_4^+$ or $H_3O^+$ and $j = 100$ to 1,000, as follows:

I. $q = 0.5$ to 6.0; $f =$ about 3; $g = 0$; $h =$ about 9; $i = 0$; wherein one contacts in aqueous sulfate solution $NH_4^+$ or $H_3O^+$ ion with a soluble salt of iron; which process yields a crystalline precursor phase having a composition expressed in terms of oxide moles as

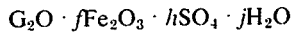

wherein G is $NH_4^+$ or $H_3O^+$ ion; $f$ has a value of $3.0 \pm 0.5$; $h$ has a value of $4.5 \pm 0.5$; $j$ has a value not exceeding about 8; the atoms of said crystalline phase being arranged in a unit cell in such a manner that a typical x-ray powder diffraction pattern has at least those lines shown in Table I.

II. $L_2O_3 = Al_2O_3$ or $Cr_2O_3$; $q = 0.5$ to 6.0; $f = 1.5$ to 4.0; $g = 0$ to 2.0; $h =$ about 9; $i = 0$; and $(f + g)$ does not exceed about 4, wherein one contacts in aqueous sulfate solution $NH_4^+$ or $H_3O^+$ ion with a soluble salt of iron and at least one material selected from the group consisting of the soluble salts of Al and Cr; which process yields a crystalline precursor phase having a composition expressed in terms of oxide moles as

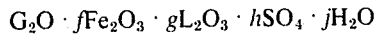

wherein G is $NH_4^+$ or $H_3O^+$ ion; and wherein $L_2O_3$ is $Al_2O_3$ or $Cr_2O_3$; $f$ has a value of $[(3.0 \pm 0.5) - g]$; $g$ has a value of 0 to 1.0; $h$ has a value of $(4.5 \pm 0.5)$; $j$ has a value not exceeding about 8; the atoms of said crystalline phase being arranged in a unit cell in such a manner that a typical x-ray powder diffraction pattern has at least those lines shown in Table I;

III. $XO_4$ is $PO_4$; $q = 0.5$ to 6.0; $f =$ about 3; $g = 0$; $h = 8.0$ to 10.0; $i = 0$ to 2.0; wherein one contacts in aqueous sulfate solution $NH_4^+$ or $H_3O^+$ ion with a soluble salt of iron and soluble form of P; which process yields a crystalline precursor phase having a composition expressed in terms of oxide moles as

wherein G is $NH_4^+$ or $H_3O^+$ ion; and wherein $XO_4$ is $PO_4$; $f$ has a value of $(3.0 \pm 0.5)$; $h$ has a value of $[(4.5 \pm 0.5) - i]$; $i$ has a value of 0 to 2.0; $j$ has a value not exceeding about 8; the atoms of said crystalline phase being arranged in a unit cell in such a manner that a typical x-ray powder diffraction pattern has at least those lines shown in Table I;

IV. $L_2O_3$ is $Al_2O_3$ or $Cr_2O_3$; $XO_4$ is $PO_4$; $g = 0.5$ to 6.0; $f = 1.5$ to 4.0; $g = 0$ to 2.0; $h = 8.0$ to 10.0; $i = 0$ to 2.0; and $(f + g)$ does not exceed about 4, wherein one contacts in aqueous sulfate solution $NH_4^+$ or $H_3O^+$ ion with at least one material selected from the group consisting of the soluble salts of Al, Fe and Cr, and a soluble form of P; which process yields a crystalline precursor phase having a composition expressed in terms of oxide moles as

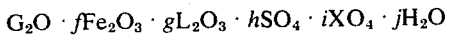

wherein G is $NH_4^+$ or $H_3O^+$ ion; and wherein $L_2O_3$ is $Al_2O_3$ or $Cr_2O_3$; and wherein $XO_4$ is $PO_4$; $f$ has a value of $[(3.0 \pm 0.5) - g]$; $g$ has a value of 0 to 1.0; $h$ has a value of $[(4.5 \pm 0.5) - i]$; $i$ has a value of 0 to 2.0; $j$ has a value not exceeding about 8; the atoms of said crystalline phase being arranged in a unit cell in such a manner that a typical x-ray powder diffraction pattern has at least those lines shown in Table I; the other reaction conditions being as described hereinabove for the crystalline jarosite-type precursor.

A suitable temperature range for digestion is from ambient to about 200°C. but as a practical matter a temperature should be chosen which is suitable to yield a useful amount of precursor material within a reasonable time. Digestion should take place for a period from about 4 to about 24 hours. Pressure is not a significant factor. Digestion at 100°C. for about 21 hours is particularly preferred.

The mineral jarosites and the synthetic JTP phases structurally related to jarosite such as those resulting from the aforesaid preparation process, which are precursors for the novel catalysts of this invention are, generally speaking, a class of crystalline materials having the crystal structure type of the potassium mineral of ideal composition $K[Fe_3(OH)_6][SO_4]$ to which the name jarosite strictly belongs but which also comprises the modifications thereof resulting from isomorphous replacement of various crystallographic units both of the simple kind wherein $[Fe_3(OH)_6]$ is partially replaced by $[Al_3(OH)_6]$ and/or $NH_4^+$ or $H^+$ ($H_3O^+$) replaces $K^+$ and also of the compensatory type of replacement such as $SO_4$ by $PO_4$ with appropriate valence balancing. The jarosite structure is characterized by a three-dimensional framework made up of linked $FeO_2 \cdot (OH)_4$ octahedra and $SO_4$ tetrahedra. Each Fe is coordinated to four OH groups and shares two oxygen ions with two sulfate groups. Three oxygen ions in every $SO_4$ group are bonded to an Fe ion and one oxygen to a sulfur ion. In the mineral jarosite the cation K is in a "cage" in the structure coordinated to six oxygen ions and six hydroxyl groups.

As a class, the preferred synthetic JTP crystalline phases which serve as precursors in the practice of this invention have a composition expressed in terms of mole ratio of oxides as $G_2O \cdot fFe_2O_3 \cdot gL_2O_3 \cdot hSO_4 \cdot iXO_4 \cdot jH_2O$ wherein G represents the same ions as in the preceding formula; and wherein $L_2O_3$ represents $Al_2O_3$, $Cr_2O_3$, $V_2O_3$, $La_2O_3$, and/or $Ce_2O_3$; wherein $XO_4$ represents $PO_4$, $MoO_4$, $VO_4$, $TiO_4$, and/or $SiO_4$; $f$ has a value of $[(3.0 \pm 0.5) - g]$; $g$ has a value of 0 to 1.0; $h$ has a value of $[(4.5 \pm 0.5) - i]$; $i$ has a value of 0 to 2.0; $j$ has a value not exceeding about 8; the atoms of said crystalline phase being arranged in a unit cell in such a manner that a typical x-ray powder diffraction pattern has at least those lines shown in Table I.

TABLE I

| Significant d-values for JTP | |
|---|---|
| d-A | Relative Intensity |
| 5.98 – 5.87 | weak |
| 5.89 – 5.72 | strong |
| 5.16 – 5.10 | very strong |
| 3.13 – 3.09 | very strong |
| 2.93 – 2.87 | medium |
| 2.58 – 2.56 | medium |
| 2.33 – 2.29 | medium |
| 1.99 – 1.98 | medium |
| 1.83 – 1.82 | medium |

Jarosite-type precursors of this invention may be distinguished from precursor materials structurally related to alunite, disclosed in co-pending patent application Ser. No. 382,152, on the basis of such factors as x-ray powder diffraction patterns and chemical composition.

Upon calcination at temperatures within the range of 650°C. to 900°C. the novel nearly amorphous compositions are formed from the crystalline JTP precursor. The resulting compositions have B-E-T $N_2$ surface areas of up to about 50 m²/gram depending on calcination temperature and chemical composition, generally exhibit a low degree of x-ray crystallinity, and retain some short-range order, with some compositions possessing more crystallinity than others. The jarosite-derived calcination products for convenience are denominated "JDC". Those JDC materials which are derived from precursors containing $M_2O_3$ and/or $XO_4$ substituents are identified by having as a prefix the symbol for the substituent, e.g. "Cr-JDC" for a product of a precursor having $Cr_2O_3$ substituted for some of its $Fe_2O_3$ content. The inclusion of noble metals into or onto JDC by metal loading or otherwise is possible, but such introduction is dissimilar to that of crystochemical substitution, etc., as described above and shall be distinguished, therefore, by using a colon, rather than a hyphen, e.g. Pd: Cr-JDC or Pd: JDC.

Within the aforementioned calcination temperature range of 650° to 900°C., JTP compositions calcined in a lower range of temperatures, namely from about 650°C. to about 750°C., yield amorphous ferrosulfate compositions characterized by appreciable sulfate content. These ferrosulfate materials have a composition expressed in terms of mole-ratios of oxides as $$ZO_4/T_2O_3 = 0.2 \rightarrow 1.3,$$

wherein $ZO_4$ represents at least one oxide selected from a group consisting of $SO_4$ and $PO_4$ and wherein $T_2O_3$ represents at least one oxide selected from a group consisting of $Fe_2O_3$, $Al_2O_3$ and $Cr_2O_3$. A preferred form of such amorphous ferrosulfate materials has the composition expressed in terms of its oxide mole-ratio as $$SO_4/Fe_2O_3 = 0.2 \rightarrow 1.3,$$

prepared by calcination within the temperature range from about 650°C. to about 750°C., of a JTP having a composition expressed in terms of oxide mole-ratios as $$R_2O \cdot 3.0 \pm 0.5 \; Fe_2O_3 \cdot 4.5 \pm 0.5 \; SO_4 \cdot zH_2O,$$

wherein R represents at least one ion chosen from a group consisting of $NH_4^+$ and $H_3O^+$; $z$ may be any value not exceeding about 8; and having a typical x-ray powder diffraction pattern essentially the same as that shown in Table I.

JTP compositions calcined in the temperature range from about 750° to about 900°C. yield amorphous materials having compositions expressed in terms of oxide mole-ratio as $$JO_4/Q_2O_3 = 0.01 \rightarrow 0.5,$$

wherein $JO_4$ represents at least one oxide selected from a group consisting of $SO_4$, $PO_4$, $MoO_4$, $VO_4$, $TiO_4$ and $SiO_4$ and wherein $Q_2O_3$ represents at least one oxide selected from a group consisting of $Fe_2O_3$, $Al_2O_3$, $Cr_2O_3$, $V_2O_3$, $La_2O_3$, and $Ce_2O_3$; with the proviso that the $SO_4/Fe_2O_3$ oxide mole-ratio does not exceed about 0.2. The reason for the $SO_4/Fe_2O_3$ oxide mole-ratio not exceeding about 0.2 is that $SO_4$ decomposes more completely as calcination temperature is increased.

Catalyst compositions thus derived from JTP precursors at 750° – 900°C. have oxide compositions expressed in terms of molar ratios as follows:

$$SO_4/T_2O_3 = 0.01 \text{ to } 0.2;$$

$$(SO_4 + PO_4)/Fe_2O_3 = 0.01 \text{ to } 0.5;$$

$$(SO_4 + PO_4)/T_2O_3 = 0.01 \text{ to } 0.5;$$

wherein $T_2O_3$ represents at least one oxide chosen from a group consisting of $Fe_2O_3$, $Al_2O_3$ and $Cr_2O_3$.

Catalytically active materials such as $K_2O$, Pt, Pd, etc., may be introduced into these oxide compositions variously by anion, cation or amine complex ionexchange or by impregnation, whichever is suitable.

It follows that oxide compositions having specific chemical and physical properties may be developed by proportioning the reagents used in synthesizing the precursor, by choosing an appropriate temperature at which to calcine such synthetic precursor, and by optionally ion-exchanging and/or loading these compositions with active materials. Detailed preparative variations will be disclosed in the subsequent examples.

Calcination of the crystalline precursor at temperatures of from 650° to 900°C. is readily carried out in air using conventional techniques and apparatus. Nitrogen and inert gas atmospheres are also suitable. The calcination, among other things, decomposes ammonium cations if such are present, causes a reduction in sulfate content, and creates a porosity essential to the product. Although the length of the calcination period is not critical, a period of from about 2 to about 4 hours is found to be entirely suitable.

Co-catalysts may be employed with the JDC materials for desired purposes, e.g., to enhance activity and/or the selectivity for a particular process, to facilitate catalyst regeneration as in oxidative removal of reaction residues, to extend activity by inhibiting build-up of reaction residues or to contribute specific catalytic activity not already present in the JDC materials. JDC materials may be regenerated by heating to at least 550°C. in a purge of air or other suitable gas. Co-catalysts include, but are not limited to, catalytically active metals or compounds of metals of Groups IB, IIB, IIB, IVB, VB, VIB, VIIB, VIII and the Lanthanide and Actinide series of the rare earths as listed in the Periodic Table as found on page B-3 of the *Handbook of Chemistry and Physics*, 46th Edition, published by the Chemical Rubber Company. Catalytically active compounds include oxides, nitrides, sulfides, halides and oxyhalides of the catalytic metals.

The co-catalysts are added to or incorporated into the JDC materials prior to, during or after the agglomeration thereof, if agglomeration is performed. One preferred method for incorporating the co-catalyst in low concentration is by ion exchange employing in aqueous solution one or more of the metals of Groups IB, IIB, IVB, VIB, and VIII having soluble cations containing the metal. This is preferably done after the formation of the new crystalline phase and may be done after the thermal decomposition of the new phase. The metal of the metal-containing cation is converted to its elemental state by heating above 200°C., preferably in a reducing atmosphere such as hydrogen. Sulfiding by treatment with hydrogen sulfide is sometimes desirable. Alternatively, or additionally, the co-catalysts may be added by impregnation techniques after the formation of the new crystalline phase. Organometallics such as the metal acetylacetonates dissolved in organic solvents may be employed in impregnation of JDC materials. Impregnation is preferably done with the powder or agglomerated catalyst in at least a partially dried state.

The active JDC materials prepared in accordance with this invention may be combined, dispersed, or otherwise intimately admixed with a porous inert or co-catalyst binder in such proportions that the resulting agglomerate product contains from about 1 to 95 percent by weight, and preferably from about 2 to 80 percent by weight, of the final composite. The incorporation of JDC material into a binder may be accomplished either before, after, or during incorporation of a co-catalyst.

The inorganic oxide may be silica, alumina or a plural gel comprising a predominant amount of silica or alumina with one or more metals or oxides selected from Groups IB, II, III, IV, V, VI, VII, and VIII of the Periodic Table. Particular preference is given to plural gels of silica with metal oxides of Groups IIA, III and IVA of the Periodic Table, especially wherein the metal oxide is magnesia, rare earth oxide, alumina, zirconia, titania, beryllia, thoria, or combinations thereof. The preparation of silica, alumina and plural gel is well known and generally involves either separate precipitation or coprecipitation techniques in which a suitable salt of the metal oxide is added to an alkali metal silicate and an acid or base, as required, is added to precipitate the corresponding oxide. The combination of the catalyst materials of the invention and an inorganic oxide gel can be prepared be several methods wherein the catalyst is intimately admixed with an inorganic oxide gel while the latter is in a hydrous state as in the form of a hydrosol, hydrogel, with gelatinous precipitate or a mixture thereof. The mixing of the two components can be accomplished in any desired manner such as in a ball mill or other type of kneading mill.

The binder may also consist of a semi-plastic or plastic clay mineral. The novel catalyst material can be incorporated into the clay simply by blending the two and fashioning the mixture into desired shapes. Suitable clays include attapulgite, kaolin, sepiolite, palygorskite, kaolinite, plastic ball clays, bentonite, montmorillonite, illite, chlorite, etc.

Minor amounts of promotors or other materials which may be present in the composition include cerium, chromium, cobalt, tungsten, uranium, platinum, lead, zinc, calcium, magnesium, barium, lithium, nickel, and their compounds.

Catalysts of this invention may be used in a powdered, granular or molded state formed into spheres or pellets of finely divided particles having a particle size of 2 to 500 mesh. In cases where the catalyst is molded, such as by extrusion, the novel catalyst materials may be extruded before drying, or dried or partially dried and then extruded.

Catalysts prepared in accordance with this invention find extensive utility in a wide variety of hydrocarbon conversion processes including isomerization of paraffins, olefins and aromatic compounds, dealkylation, alkylation of isoparaffins, and aromatics, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization, cracking, denitrification, and the like.

Of particular importance in relation to the catalysts of this invention are catalytic processes of dehydrogenation of n-paraffins and ethylbenzene. The products of these two dehydrogenation processes are commercially important because they find utility in the manufacture of biodegradable detergents and styrene, respectively. Preferred catalyst compositions for such dehydrogenation reactions include those materials listed in Example 3 hereinbelow.

Especially preferred because they exhibit a high degree of activity for ethylbenzene dehydrogenation are the catalyst compositions derived from JTP precursors, containing additionally from 5 to 20 wt.-% $K_2O$ and having a B-E-T $N_2$ surface area of less than about 10 $M^2$/gram. These catalyst materials are of the type preferred to hereinabove, namely, those characterized by oxide mole-ratios as $JO_4/Q_2O_3 = 0.01$ to 0.5. Preferred compositions of this type are characterized by oxide mole-ratios as: $SO_{4/Fe_2O_3} = 0.01$ to 0.2; $SO_4/T_2O_3 = 0.01$ to 0.2; $(SO_4 + PO_4)/Fe_2O_3 = 0.01$ to 0.5; and $(SO_4 + PO_4)/T_2O_3 = 0.01$ to 0.5, all exhibiting a high degree of activity in the dehydrogenation of ethylbenzene to styrene.

The processes of this invention may be carried out in any equipment suitable for catalytic operations and may be practiced on a batchwise basis. It is preferable, however, and generally more advantageous to operate continuously. Accordingly, these processes may be practiced using a fixed catalyst bed. Also, these processes may be operated using a moving catalyst bed wherein the hydrocarbon flow is concurrent or countercurrent to the catalyst flow. A fluid type of operation wherein the catalyst is carried in suspension in the hydrocarbon charge is well adapted for use with the catalysts of this invention.

In addition to catalysts, the present invention discloses processes for the catalytic conversion of hydrocarbons.

The hydrocracking process of this invention comprises passing the petroleum feedstock in admixture with hydrogen over the catalyst at a suitable temperature, feed rate, and pressure to effect a substantial conversion of the feed stock to lower boiling materials such as gasoline.

Catalysts of the invention may be utilized for the alkylation of aromatic hydrocarbons or phenols with olefinic unsaturated hydrocarbons, alkyl halides and alkyl sulfates. Alkylation of aromatics and phenols may be carried out at temperatures between 0°C. and 450°C. under pressure of 0 to 1,000 psig.

The catalysts of the present invention are extremely active and may be used for the isomerization of a wide variety of feed stocks. Thus, low boiling paraffin hydrocarbons which contain at least four carbon atoms, especially 4 to 10 carbon atoms or olefins of the same carbon number range, such as, for example, normal butene, normal pentene, 2-methyl-1-pentene, 2-methyl-2-pentene may be used.

The conditions under which hydrocarbons are isomerized in accordance with the invention include a temperature ranging from 10°C. to about 450°C. and preferably between about 120°C. and 400°C. The liquid hourly space velocity (LHSV) is between about 0.05 and 40 and preferably between about 0.25 and 10. The molar ratio of hydrogen to hydrocarbon is between 0.1 and 20 and is preferably between 0.5 and 5. The reaction may be effected under liquid or vapor phase conditions at subatmospheric, atmospheric or superatmospheric pressure. The pressure will be between about 5 to 7,500 psia, and is preferably between about 100 and 700 psia.

The catalysts of this invention may be used for the isomerization of polyalkyl-substituted aromatic compounds such as xylene, di-ethyl benzene, di-isoproply benzene, dimethyl naphthalene and the like. Feed to the process of the invention as an example, can be substantially pure xylene isomer, a mixture of xylene isomers or hydrocarbon fractions rich in xylene isomers. The process of the invention is carried out at a temperature in the range of from about 205°C. to 510°C. and preferably from about 280° to 430°C.

The isomerization reaction can be conducted at a space velocity (WHSV) in the range from about 0.5 to 25, preferably in the range from about 1 to 10.

The presence of hydrogen functions to improve catalyst life, and apparently also, functions to improve conversion and selectivity for the isomerization reaction. A hydrogen-to-hydrocarbon mole ratio of from about 1:1 to 25:1 and preferably from about 5:1 to 15:1 is used. Total pressure is in the range from about 100 to 1,500 psig, and preferably from about 500 to 1,000 psig.

The materials of this invention catalyze the disproportionation of alkylaromatics such as toluene. Feed for the process of the invention can be substantially pure alkylaromatic having from 7 to 15 carbon atoms, mixture of such alkylaromatics and includes mono- and diaromatics such as alkylbenzenes and alkylnaphthalenes. The alkylaromatic is converted to higher alkylaromatics and to lower alkylaromatics, including benzene or naphthalene.

This process is conducted at a temperature in the range from about 200°C. to 600°C. and preferably from about 300°C. to 450°C. In general, disproportionation is increased as temperature is increased.

A hydrogen-to-oil mole ratio from about 1:1 to about 50:1 is used. Total pressure is in the range from about 100 to 2,000 psig. The disproportionation reaction is effected at a space velocity (WHSV) in the range from about 0.1 to about 25.

The catalysts of this invention are useful for the production of polymer gasoline, petrochemical intermediates and high molecular weight oils and resins. These products are obtained from feed stocks rich in $C_2$ to $C_8$ olefins which are contacted with the catalyst at temperatures ranging from 0°C. to 300°C. at pressures of 1 to 1,000 atmospheres, preferably 1 to 200 atmospheres. Non-distillable high boiling and resinous products are removable from the catalyst by solvent extraction but may, if desired, retain the catalyst.

Catalytic cracking utilizing the catalysts of this invention alone or with conventional cracking catalyst material, for example silica-alumina, is conducted in a fluid-bed, or a fixed-bed with moving catalyst particle withdrawal for catalyst regeneration. The hydrocarbon feed is of the gas-oil type boiling in the range of 205°C. to 540°C. The feed is preheated and contacted with the catalyst at temperatures ranging from 370°C. to 650°C. at a feed rate of 0.5 to 10 liquid volumes per volume of catalyst per hour. The conversion to gasoline fraction and lighter hydrocarbons is about 30 to 70 percent.

Isoparaffin alkylation for the production of high octane gasoline is conducted with the catalyst of this invention using feeds rich in $C_4$ to $C_6$ isoparaffins singly or mixed. The alkylating olefin is a $C_2$ to $C_6$ unsaturated hydrocarbon and may be one or a mixture thereof having straight or branched chain structure. Process conditions include liquid, liquid-vapor or vapor phase operation in the temperature range of 20°C. to 300°C. The pressure is suitably maintained for the liquid and/or vapor phase operation as desired with preference for pressures conducive to the presence of at least partial liquefaction of one of the reactant or alkylate products within the catalyst contact zone. The mole ratio of feed olefin to isoparaffin is at most 1:4. A catalyst contacting rate for the olefin is 0.01 to 2 weight hourly basis.

Dealkylation and hydrodealkylation wherein a hydrogenation co-catalyst may be employed with the catalysts of this invention are processes similar respectively to cracking and hydrocracking of more specific feed materials than used in the latter processes. The process is directed primarily to the removal of $C_2-C_4$ alkyl groups pendant to aromatic molecules, for example, the removal of methyl or ethyl group from toluene, ethylbenzene or methyl- or ethylsubstituted naphthalenes. Temperatures useful for dealkylation range from 400°C. to 700°C., at 3 to 100 atmospheres pressure. Hydrogen is added at a mole ratio of 3 to 100 to the feed.

The following examples demonstrate the synthesis of various oxide and sulfate compositions and the catalytic efficacy of selected compositions prepared according to this invention.

EXAMPLE 1

In an example demonstrating the catalytic activity in converting ethylbenzene to styrene of K-containing JDC compositions, 1011 g of $Fe_2(SO_4)_3 \cdot 9H_2O$ were dissolved in about 1500 cc of hot distilled $H_2O$ and about 360 g of $NH_4OH$ (29% $NH_3$) added to the solution. The slurry was stirred at reflux for 21 hours and the solid reaction product was filtered, washed with about 2 liters of distilled $H_2O$, dired at 110°C. for about 6 hours. Chemical analysis of the above product revealed the following: 4.9 wt.-% $(NH_4)_2O$, 44.5 wt.-% $Fe_2O_3$, 41.5 wt.-% $SO_4$, and 9.1 wt.-% $H_2O$. The molar oxide composition was $(NH_4)_2O \cdot 3.0\ Fe_2O_3 \cdot 4.6\ SO_4 \cdot 5.4\ H_2O$; $SO_4/Fe_2O_3 = 1.55$. X-ray examination showed that the crystalline product had a typical x-ray powder diffraction pattern as shown in Table I.

About 500 g of the above crystalline precursor phase were calcined at 900°C. for 3 hours with an air purge. About 227 g of the calcination product were slurried in 150 cc of aqueous $K_2CO_3$ solution containing 55 g of $K_2CO_3 \cdot 1.5\ H_2O$. The water was then removed at 100°C. and the dry catalyst calcined at 900°C. for 1 hour with an air purge. The resultant material had the following chemical composition: 11.1 wt.-% $K_2O$, 88.0 wt.-% $Fe_2O_3$ and 0.9 wt.-% $SO_4$.

About 39.2 g of the above catalyst material were tested for activity in the dehydrogenation of ethylbenzene to styrene at 600°C., at atmospheric pressure with a steam/ethylbenzene mole ratio of 17.5 and a space-time value of 0.5 seconds. The catalyst produced a 49.3% single pass conversion of ethylbenzene to styrene and an overall efficiency of 92.7% of reacted ethylbenzene to styrene. B-E-T $N_2$ surface area of the used catalyst was 1.68 $m^2$/g.

EXAMPLE 2

In an example demonstrating the catalytic activity in converting ethylbenzene to styrene of a K-and Cr-containing JDC composition, 1011 g of $Fe_2(SO_4)_3 \cdot 9H_2O$ and about 66 g of $Cr_2(SO_4)_3 \cdot 5H_2O$ were dissolved in about 1500 cc of distilled $H_2O$, and about 360 g of $NH_4OH$ (29% $NH_3$) added to the solution. The slurry was stirred at reflux for 21 hours and the solid product was separated by filtration, washed with about 2 liters of distilled $H_2O$ and then dried at 110°C. for about 6 hours.

Chemical analysis established the solid reaction product composition to be as follows: 4.9 wt.-% $(NH_4)_2O$, 43.0 wt.-% $Fe_2O_3$, 1.3 wt.-% $Cr_2O_3$, 41.4 wt.-% $SO_4$, 9.4 wt.-% $H_2O$; x-ray examination showed the crystalline product had a typical x-ray powder diffraction pattern as shown in Table I. The oxide composition was $(NH_4)_2O \cdot 2.9\ Fe_2O_3 \cdot 0.1\ Cr_2O_3 \cdot 4.6\ SO_4 \cdot 5.6\ H_2O$; $SO_4/M_2O_3 = 1.56$.

About 500 g of the above crystalline precursor phase were calcined at 900°C. for 3 hours with an air purge. About 220 g of the calcined catalyst was slurried in 200 cc of aqueous $K_2CO_3$ solution containing 30 g of $K_2CO_3 \cdot 1.5\ H_2O$. The water was then removed by evaporation at 110°C. and the dry catalyst calcined at 900°C. for 2 hours with an air purge. Chemical analysis of the resultant calcination product revealed the following: 5.3 wt.-% $K_2O$, 2.8 wt.-% $Cr_2O_3$, 91.2 wt.-% $Fe_2O_3$, and 0.7 wt.-5 $SO_4$.

About 49.4 g of the catalyst in the form of 3/16 inch pellets was tested for activity in the dehydrogenation of ethylbenzene to styrene at 600°C., atmospheric pressure, steam/ethylbenzene mole ratio of 17.5, and a space time of 0.5 seconds. The catalyst produced a 47.4 percent single pass conversion of ethylbenzene to styrene and an overall efficiency of 87.1 percent of reacted ethylbenzene to styrene. The used catalyst had B-E-T $N_2$ surface area of 3.60 $m^2$/g.

EXAMPLE 3

In connection with another example of this invention demonstrating hydrocarbon dehydrogenation capacities of JDC compositions, the following data tabulation is presented:

DEHYDROGENATION

Ethylbenzene Vapor phase flow reactor system
Reactants: 25 cc 3/16" catalyst pellets, steam/ethylbenzene mole ratio = 17.5, space time = 0.52 seconds

| Catalyst | Catalyst Description | Reaction Time | Reaction Temp. | Reaction Pressure | Single Pass Conversion to Styrene | Efficiency |
|---|---|---|---|---|---|---|
| K-Cr-Fe-JDC Comp. | $NH_4$-Cr-JTP calcined at 900°C in air, impregnated with $K_2CO_3$, calcined at 900°C in air<br>Catalyst Chemical Analysis: 5.1 wt-% $K_2O$<br>2.7 wt-% $Cr_2O_3$<br>88.2 wt-% $Fe_2O_3$<br>0.7 wt-% $SO_4$ | 16 hrs. | 600°C | ambient | 47.4 | 87.1 |

DEHYDROGENATION—Continued

Ethylbenzene Vapor phase flow reactor system
Reactants: 25 cc 3/16" catalyst pellets, steam/ethylbenzene mole ratio = 17.5, space time = 0.52 seconds

| Catalyst | Catalyst Description | Reaction Time | Reaction Temp. | Reaction Pressure | Single Pass Conversion to Styrene | Efficiency |
|---|---|---|---|---|---|---|
| K-Cr-Fe-JDC Comp. | $NH_4$-Cr-JTP calcined at 900°C in air, impregnated with $K_2CO_3$, calcined at 750°C in air<br>Catalyst Chemical Analysis: 14.1 wt.-% $K_2O$<br>2.0 wt.-% $Cr_2O_3$<br>83.8 wt.-% $Fe_2O_3$<br><0.5 wt.-% $SO_4$ | 16 hrs. | 600°C | ambient | 50.8 | 89.8 |
| K-Fe-JDC Comp. | $NH_4$-JTP calcined at 900°C in air, impregnated with $K_2CO_3$, calcined at 900°C in air<br>Catalyst Chemical Analysis: 10.5 wt.-% $K_2O$<br>83.0 wt.-% $Fe_2O_3$<br>0.8 wt.-% $SO_4$ | 16 hrs. | 600°C | ambient | 49.3 | 92.7 |

EXAMPLE 4

In another example demonstrating the synthesis of a multi-component oxide JDC, derived from $NH_4$-Cr-Al-JTP, about 842 grams of $Fe_2(SO_4)_3 \cdot 9H_2O$, 200 grams of $Al_2(SO_4)_3 \cdot 18H_2O$, and 66 grams of $Cr_2(SO_4)_3 \cdot 5H_2O$ were dissolved in about 1500 cc of distilled $H_2O$ to which was then added 360 grams of $NH_4OH$ (29% $NH_3$). The solution was refluxed with stirring for 21 hours. The solid product was separated by filtration, washed with about 2 liters of distilled $H_2O$ and then dried at about 110°C. for 6 hours. The synthesis oxide composition was: $5.0 (NH_4)_2O \cdot 2.5 Fe_2O_3 \cdot 0.5 Al_2O_3 \cdot 0.2 Cr_2O_3 \cdot 9.6 SO_3 \cdot 150 H_2O$. X-ray examination showed that the crystalline product had an x-ray powder diffraction pattern having at least those lines contained in Table I. A chemical analysis of the JTP revealed the following: 5.1 wt.-% $(NH_4)_2O$; 1.4 wt.-% $Cr_2O_3$; 1.6 wt.-% $Al_2O_3$; 40.6 wt.-% $Fe_2O_3$; 42.4 wt.-% $SO_4$; 8.9 wt.-% $H_2O$.

About 500 g of the above crystalline JTP was calcined at 900°C. for 3 hours in air. About 270 g of the calcined material was then slurried in 150 cc of $K_2CO_3$ solution containing 70 g of anhydrous $K_2CO_3$. The water was removed by drying at 150°C. and the catalyst calcined at 750°C. for one hour in air. A chemical analysis of the catalyst revealed the following: 14.6 wt.-% $K_2O$, 2.7 wt.-% $Cr_2O_3$, 3.3 wt.-% $Al_2O_3$, 78.9 wt.-% $Fe_2O_3$, < 0.5 wt.-% $SO_4$ on an anhydrous basis.

The above catalyst material was tested for activity in the dehydrogenation of ethylbenzene to styrene at 600°C., at atmospheric pressure with a steam/ethylbenzene mole ratio of ~ 17 and a space-time value of 0.5 seconds. The catalyst produced a 54.9 percent single pass conversion of ethylbenzene to styrene and an overall efficiency of 86.7 percent of reacted ethylbenzene to styrene.

EXAMPLE 5

In another example demonstrating the synthesis of a multi-component oxide JDC, derived from $NH_4$ — Cr-P-JTP, about 1011 grams of $Fe_2(SO_4)_3 \cdot 9H_2O$, 120 grams of $(NH_4)_2HPO_4$ and 66 grams of $Cr_2(SO_4)_3 \cdot 5H_2O$ were dissolved in about 1500 cc of distilled $H_2O$ to which was then added 360 grams of $NH_4OH$ (29% $NH_3$). The solution was refluxed with stirring for 21 hours. The solid product was separated by filtration, washed with about 2 liters of distilled $H_2O$ and then dried at about 110°C. for 6 hours. The synthesis oxide composition was $8.0 (NH_4)_2O \cdot 3.0 Fe_2O_3 \cdot 0.2 Cr_2O_3 \cdot$ $1.5 PO_4 \cdot 9.6 SO_3 \cdot ~150 H_2O$. X-ray powder diffraction pattern having at least those lines contained in Table I. A chemical analysis of the product phase revealed the following: 5.0 wt.-% $(NH_4)_2O$, 1.4 wt.-% $Cr_2O_3$, 43.2 wt.-% $Fe_2O_3$, 9.5 wt.-% $PO_4$, 34.8 wt.-% $SO_4$, 6.1 wt.-% $H_2O$. About 500 g of the above crystalline JTP was calcined at 900°C. for 3 hours in air. About 313 g of the calcined material was then impregnated with 200 cc of $K_2CO_3$ solution containing 80 g of anhydrous $K_2CO_3$. The water was removed by drying at 150°C. The catalyst was calcined at 750°C. for 1 hour in air. A chemical analysis of the catalyst revealed the following: 13.8 wt.-% $K_2O$, 2.3 wt.-% $Cr_2O_3$, 68.2 wt.-% $Fe_2O_3$, 15.3 wt.-% $PO_4$, and < 0.5 wt.-% $SO_4$ on an anhydrous basis.

EXAMPLE 6

In an example of this invention which demonstrates the preparation of a Cr-containing JTP, 672 grams of $Fe_2(SO_4)_3 \cdot 9H_2O$ and 336 grams of $Cr_2(SO_4)_3 \cdot 5H_2O$ were dissolved in 1500 cc of water. To this was added 360 grams of $NH_4OH$ (60%). The overall molar composition of the resulting mixture was in terms of component oxides: $5.0 (NH_4)_2O \cdot 2.0 Fe_2O_3 \cdot 1.0 Cr_2O_3 \cdot 9.0 SO_3 \cdot$ approximately 160 $H_2O$. This slurry was digested at 100°C. under reflux conditions for 21 hours. The solids were separated from the liquor by filtration, washed with water and dried at 110°C. X-ray analysis of a sample indicated that the crystalline product had an x-ray powder diffraction pattern having at least those lines contained in Table I. Chemical analysis gave the following molar oxide composition: $1.0 (NH_4)_2O \cdot 2.4 Fe_2O_3 \cdot 0.43 Cr_2O_3 \cdot 4.4 SO_4 \cdot 5.0 H_2O$. A portion of the above material was calcined in air at 650°C. for 2 hours. X-ray diffraction analysis showed the sample to be essentially amorphous with no evidence of the crystalline precursor phase. Chemical analysis of this JDC material showed the following composition: $Fe_2O_3$ = 74.1 wt.-%, $Cr_2O_3$ = 12.4 wt.-%, $SO_4$ = 20.7 wt.-%, the molar ratio $SO_4/M_2O_3$ being 0.40 where $M_2O_3$ is equal to $Fe_2O_3 + Cr_2O_3$.

EXAMPLE 7

In an example of this invention which demonstrates the preparation of JTP, 1011 grams of $Fe_2(SO_4)_3 \cdot 9H_2O$ were dissolved in 1500 cc of water. To this was added 360 grams of $NH_4OH$ (60%). The overall molar composition of the resulting mixture was in terms of component oxides: $5.0 (NH_4)_2O \cdot 3.0 Fe_2O_3 \cdot 9.0 SO_3 \cdot$ approximately $150H_2O$. This slurry was digested at 100°C. under reflux conditions for 21 hours. The solids were separated from the liquor by filtration, washed with water and dried at 110°C. X-ray analysis of a sample indicated that the crystalline product had an x-ray powder diffraction pattern having at least those lines contained in Table I. Chemical analysis gave the following molar oxide composition: 1.0 $(NH_4)_2O \cdot 3.1$ $Fe_2O_3 \cdot 5.1$ $SO_4 \cdot 3.7$ $H_2O$. A portion of the above material was calcined in air at 650°C. for 2.5 hours. X-ray diffraction analysis showed the sample to be essentially amorphous with no evidence of the crystalline precursor phase. Chemical analysis of this JDC material showed the following composition: $Fe_2O_3 = 64.6$ wt.-%, $SO_4 = 39.4$ wt.-%, the molar ratio $SO_4/Fe_2O_3$ being 1.02.

What is claimed is:

1. Process for preparing catalyst compositions which comprises providing an aqueous reaction mixture having a composition expressed in terms of mole ratios of oxides as

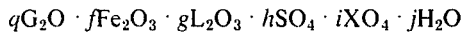

$$qG_2O \cdot fFe_2O_3 \cdot gL_2O_3 \cdot hSO_4 \cdot iXO_4 \cdot jH_2O$$

wherein G represents at least one cation selected from the group consisting of $NH_4^+$, $H^+$, $Ag^+$, and alkali metal ions, wherein $L_2O_3$ represents at least one oxide selected from the group consisting of $Al_2O_3$, $Cr_2O_3$, $V_2O_3$, $La_2O_3$, and $Ce_2O_3$: $XO_4$ represents at least one oxide selected from the group consisting of $PO_4$, $MoO_4$, $VO_4$, $SiO_4$ and $TiO_4$; $q$ has a value of from 0.5 to 6.0; $f$ has a value of from 1.5 to 4.0; $g$ has a value of from 0 to 1.0; $h$ has a value of from 8.0 to 10.0; $i$ has a value of from 0 to 2.0; $j$ has a value of from 100 to 1,000; the sum of $f + g$ has a value not exceeding 4.0; establishing the pH of said reaction mixture in the range of 1.5 to 4.5, digesting said aqueous reaction mixture within a temperature range of from about 80 to about 200°C. for a period of from at least 4 hours to a period sufficient to complete crystallization, recovering the crystalline reaction product, and calcining the crystalline reaction product at a temperature of from 650°C. to 900°C.

2. Catalyst composition prepared by the process of claim 1.

* * * * *